United States Patent [19]
Yoshida et al.

[11] Patent Number: 5,535,436
[45] Date of Patent: Jul. 9, 1996

[54] PORTABLE TRANSCEIVER AND ESN TRANSFER SYSTEM THEREFOR

[75] Inventors: Ikio Yoshida, Tokyo; Masahiro Ishigami, Saitama, both of Japan

[73] Assignee: NEC Corporation, Tokyo, Japan

[21] Appl. No.: 387,384

[22] Filed: Feb. 13, 1995

Related U.S. Application Data

[63] Continuation of Ser. No. 735,735, Jul. 25, 1991, abandoned.

[30] Foreign Application Priority Data

Jul. 25, 1990 [JP] Japan ................................. 2-196794

[51] Int. Cl.$^6$ .................................................. H04B 1/40
[52] U.S. Cl. ............................ 455/89; 455/88; 455/186.1; 379/62
[58] Field of Search ............................ 458/54.1, 56.1, 458/86, 89, 90, 186.1, 89.1, 88, 186.2, 151.4; 379/58, 59, 61, 62, 63, 93, 355; 455/275, 277.1, 330, 77; 340/825.31, 825.34, 825.44, 33.1

[56] References Cited

U.S. PATENT DOCUMENTS

| | | | |
|---|---|---|---|
| 4,593,155 | 6/1986 | Hawkins | 455/89 |
| 4,661,992 | 4/1987 | Garay et al. | 455/89 |
| 4,673,861 | 6/1987 | Dubovsky et al. | 455/89 |
| 4,688,261 | 8/1987 | Kelloway et al. | 455/186.1 |
| 4,792,939 | 12/1988 | Hikita et al. | 455/86 |
| 4,805,211 | 2/1989 | Brennan et al. | 379/355 |
| 4,811,377 | 3/1989 | Krolopp et al. | 379/62 |
| 4,864,644 | 9/1989 | Takahashi et al. | 455/330 |
| 4,914,714 | 3/1990 | Tamura | 455/277.1 |
| 5,020,144 | 5/1991 | Shirley, Jr. et al. | 455/186.1 |
| 5,029,233 | 7/1991 | Metroka | 455/54.1 |
| 5,060,295 | 10/1991 | Borras et al. | 455/186.1 |
| 5,086,513 | 2/1992 | Lawrence et al. | 455/77 |
| 5,103,459 | 4/1992 | Gilhousen et al. | 455/54.1 |
| 5,155,860 | 10/1992 | McClure | 455/89 |

FOREIGN PATENT DOCUMENTS 310318  4/1989  European Pat. Off. .

*Primary Examiner*—Reinhard J. Eisenzopf
*Assistant Examiner*—Nguyen Vo
*Attorney, Agent, or Firm*—Sughrue, Mion, Zinn, Macpeak & Seas

[57] ABSTRACT

A portable transceiver and an ESN transfer system for a car telephone system. The ESN and the MSN, which are manufacturer-controlled numbers, are stored in an EEPROM mounted on the panel of the portable transceiver. When the panel on which the EEPROM is mounted is to be replaced, only the ESN is transferred to the EEPROM of the new panel. Upon completion of the ESN transfer, the ESN in the EEPROM of the replaced panel is rewritten to data, which would make its specific part, such as the manufacturer's ID number, to be judged "incorrect". No ESN whose specific part is "incorrect" can be transferred. The ESN transfer unit, connected to a connector provided in the casing of the portable transceiver, performs said ESN transfer.

19 Claims, 5 Drawing Sheets

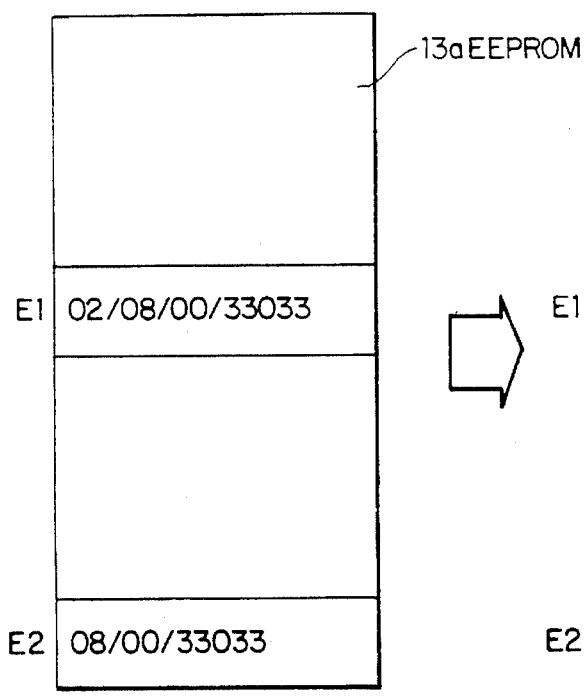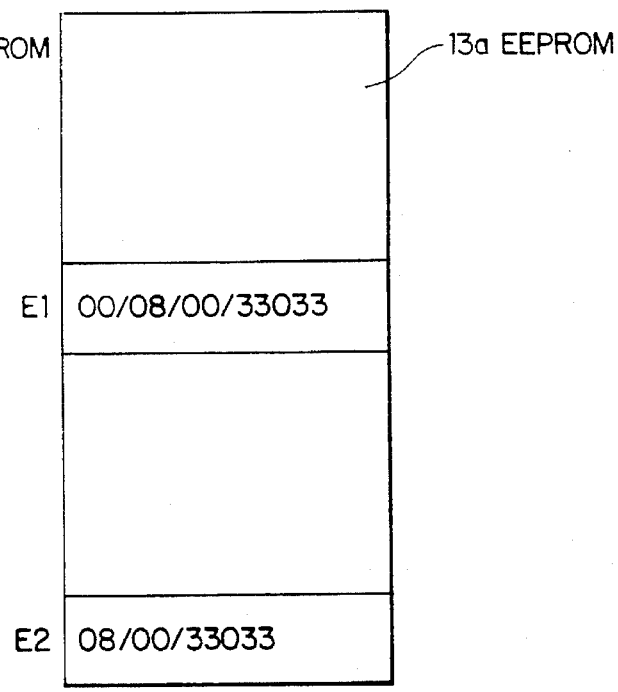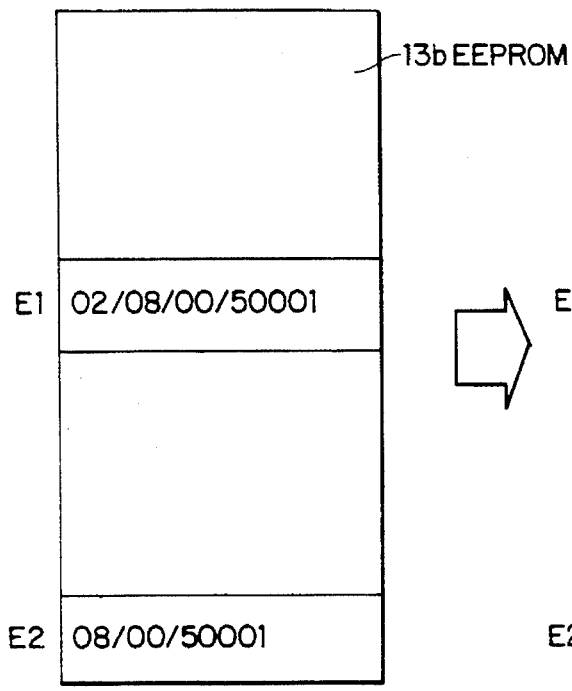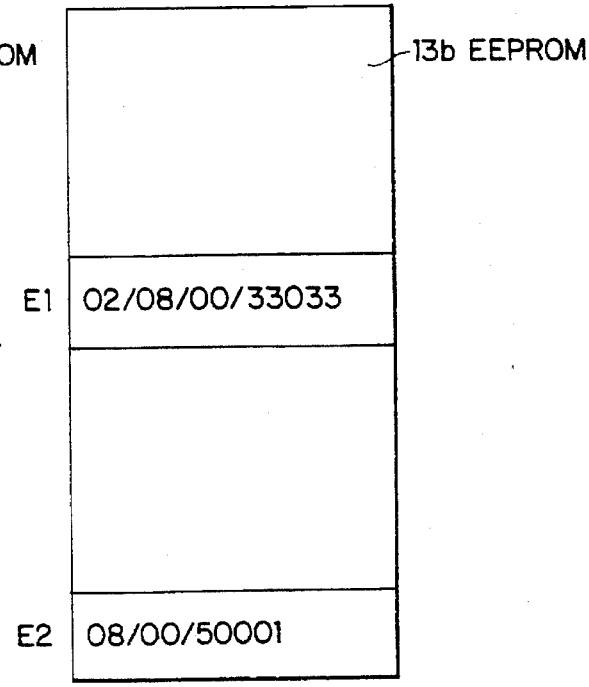

PORTABLE TRANSCEIVER AND ESN TRANSFER SYSTEM THEREFOR

This is a Continuation of application Ser. No. 07/735,735 filed Jul. 25, 1991, now abandoned.

BACKGROUND OF THE INVENTION

The present invention relates to a portable transceiver used as a portable unit in a cellular telephone system and to a transfer system for electronic serial numbers (ESN's) used by portable transceivers and, more particularly, to a portable transceiver and an ESN transfer system capable of preventing ESN's used in the transceivers from being duplicated.

Each portable transceiver used as a mobile unit in a car telephone system is assigned a unique ESN to identify or specify the transceiver. The transceiver, when initiating a call to the base station, sends out a call initiation signal including the ESN assigned to it. When receiving an arriving call from the base station, the portable transceiver responds with an arriving call response signal including its ESN. An ESN is required to be unique to each individual transceiver, but not to be duplicated among a plurality of transceivers. The way in which an ESN is assigned to each individual transceiver in compliance with this requirement is left to the choice of the manufacturer of the transceivers.

A first example of a method conventionally adopted to prevent the duplication of the same ESN is to use a PROM into which no rewriting is possible (a one-time PROM) as a memory for the storage of the ESN. In a portable transceiver using this method, when the panel or the apparatus (hereinafter-collectively referred to as the panel) on which such a one-time PROM is mounted is to be replaced to remedy trouble or for any other reason, the one-time PROM fitted to the panel to be replaced should be shifted to the new panel. However, along with the size reduction of portable transceivers, the replacement of the one-time PROM has become increasingly difficult and time-consuming.

A second conventional method is to use an electronically erasable PROM (EEPROM) as a memory for the storage of the ESN. In a portable transceiver using this method, when the panel on which such an EEPROM storing the ESN is mounted is to be replaced in a maintenance procedure, the ESN should be read out of the EEPROM on the panel to be replaced and transferred to another EEPROM on the new panel. Therefore, such a portable transceiver, which involves no need to shift the EEPROM from the panel to be replaced to the new panel, has the advantage of easier maintenance over the aforementioned first example of the prior art. However, it still is not free from the risk of erroneously transferring the ESN in an EEPROM mounted on a specific panel to more than one EEPROM or of leaving the ESN unerased in the EEPROM even after the transfer of the ESN, making it difficult to ensure the protection of a specific ESN from being duplicated.

By another conventional method, an ESN transfer program for use in the transfer of the ESN stored in the EEPROM is provided on the panel itself of the portable transceiver. This is the ESN transfer method used in the KS Mobile Audio/Logic Board (made by Motorola Inc., U.S.A.) (cf. Cellular Subscriber Technical Training Manual by Motorola). By this technique, two boards on each of which an EEPROM is mounted are connected with a connecting cable, by way of which the ESN is transferred in a series of procedures. Connecting the two boards with the connecting cable, however, requires the opening of the portable transceiver's casing, entailing a correspondingly longer working time.

Whereas the replaced panel is usually repaired by its manufacturer, whether or not the cost of the panel repair is to be charged to the user is often cumulated referring to the ESN, resulting in the problem that a transfer of an ESN between a panel whose repair cost is charged to its user and another which is repaired free of charge disturbs the maintenance history management of the panel.

SUMMARY OF THE INVENTION

An object of the present invention is to provide a portable transceiver which can ensure the prevention of duplicated assignment of the same ESN.

A second object of the invention is to provide a portable transceiver whose maintenance is improved in accuracy and facilitated.

A third object of the invention is to provide an ESN transfer system which can ensure the prevention of duplicated assignment of the same ESN.

A fourth object of the invention is to provide an ESN transfer system which can improve the accuracy of and facilitate the maintenance of the portable transceiver using the system.

A fifth object of the invention is to provide an ESN transfer apparatus which can ensure the prevention of duplicated assignment of the same ESN.

A sixth object of the invention is to provide an ESN transfer apparatus which can improve the accuracy of and facilitate the maintenance of the portable transceiver using the apparatus.

According to the present invention, there is provided a portable transceiver comprising a radio section for transmitting and receiving radio frequency signals to and from the base station of a cellular telephone system through an antenna. The radio section processes receive signals arriving through the antenna, and sends out transmit signals through the antenna. A control and operation circuit connected to this radio section processes calls to and from the base station by controlling the radio section and controls the communication. The control and operation circuit is provided with an EEPROM for storing the ESN by which the base station identifies the calling subscriber and the called subscriber. In a first memory area of this EEPROM are stored ESN's and in a second memory area, a manufacturing serial number (MSN).

The ESN includes a specific part, such as the 10 manufacturer's identification (ID) number by which is known the manufacturer of the panel containing the EEPROM storing the ESN. When the ESN is to be transferred to the EEPROM of a new panel on account of the failure of the existing panel or for any other reason, said specific part of the ESN stored in the EEPROM on the panel to be replaced is immediately replaced with a prescribed number indicating the need for replacement. No ESN involving the prescribed number in said specific part is transferred to an EEPROM on any other panel. Therefore, no single correct ESN can ever be stored in duplicate in the EEPROM's of more than one panel.

In the MSN memory area are stored data to specify the EEPROM involving this area. The MSN is not transferred even if the ESN is transferred to another panel, because each panel should be identified by its MSN when the portable transceiver is to undergo maintenance work.

The aforementioned ESN transfer is achieved by connecting a first portable transceiver involving the panel to be received and a second portable transceiver involving a new panel to an ESN transfer unit.

In the ESN transfer unit to be used for this ESN transfer, ESN reading means first reads out a first ESN stored in a first EEPROM of the first portable transceiver. Judging means receiving this read-out output judges whether or not a specific part of the first ESN which has been read out is correct and, if it is judged correct, transfer means transfers the first ESN to a second EEPROM in the second portable transceiver, and at the same time rewrites the content of the first EEPROM with rewriting means so that the specific part of the first ESN in the first EEPROM be judged incorrect thereafter by the judging means. The ESN transfer unit never rewrites the MSN's stored in second memory areas of the first and second EEPROM's.

If the ESN of a portable transceiver is rewritten with this ESN transfer unit, the same ESN can never be simultaneously stored in EEPROM's of more than one panel. As the MSN is never transferred even if the ESN of the same EEPROM is transferred, the maintenance personnel can readily and correctly identify the panel in any portable transceiver by reading the MSN stored in its EEPROM.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 4 is a diagram illustrating an example of memory map of the EEPROM 13a in the portable transceiver 10a shown in FIG. 3;

FIG. 5 is a diagram illustrating an example of memory map of the EEPROM 13b in the portable transceiver 10b shown in FIG. 3.

DETAILED DESCRIPTION OF THE PREFERRED EMBODIMENTS

Figure 1:
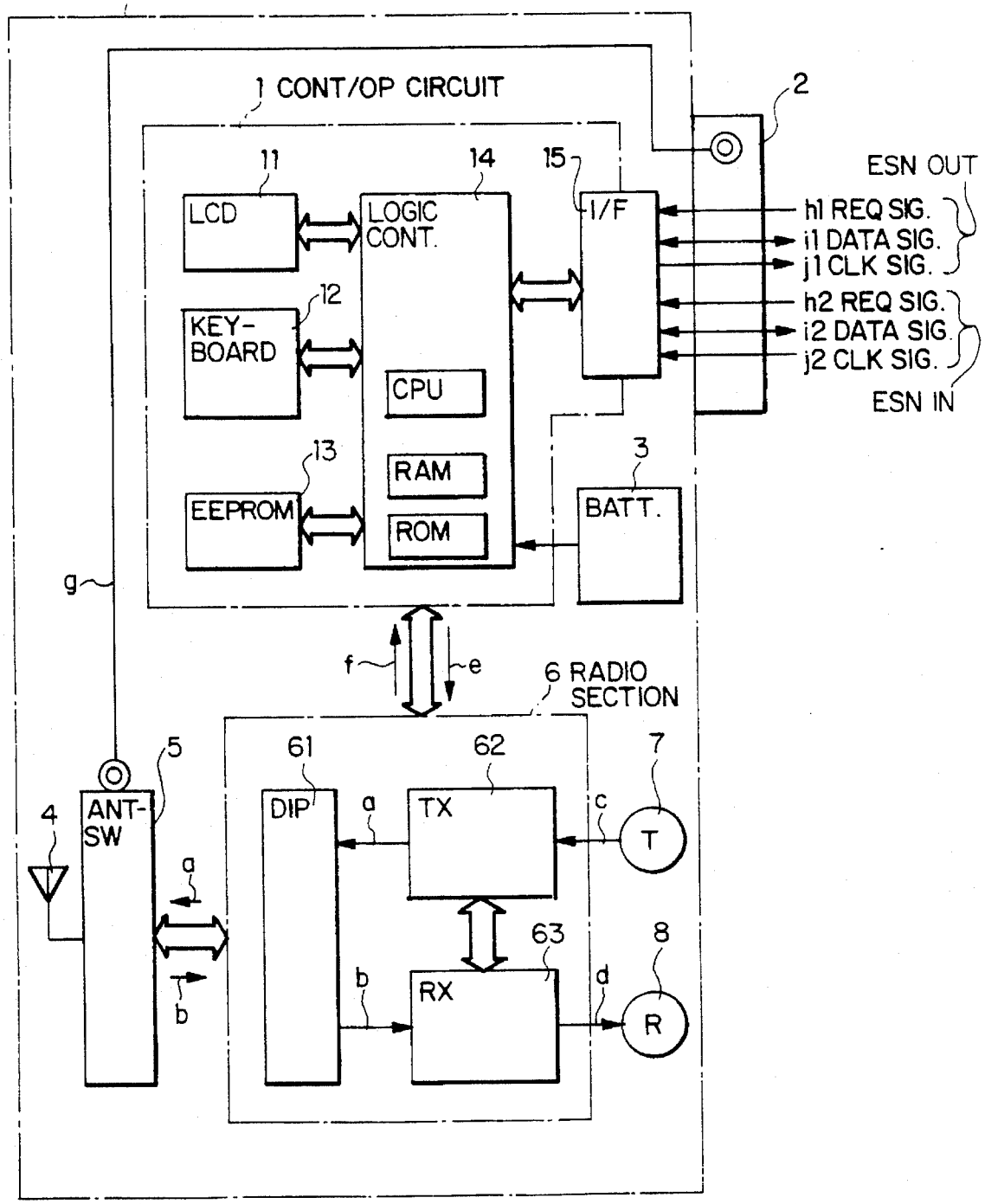
FIG. 1 is a block diagram illustrating a portable transceiver according to a preferred embodiment of the invention.

Referring to FIG. 1, a portable transceiver 10 is generally contained in a housing having a volume of 150 cc to 200 cc has various functions required for a portable unit in a cellular telephone system. An antenna 4 transmits a transmit signal a to a base station in the cellular telephone system, and picks up a radio frequency signal, radiated from the base station. The picked up signal is supplied as a receive signal b to a radio section 6. The radio section 6 generates the transmit signal a and processes the receive signal b under the control of a control and operation circuit 1. The control and operation circuit 1 controls call connections (for both outgoing and incoming calls), communication and the like with the base station.

To the radio section 6 is connected one end of an antenna switch (ANT-SW) 5, of whose terminals to be switched one is connected to the antenna 4 and the other, to an external connector 2. The ANT-SW 5 is connected to the antenna 4 when the portable transceiver 10 is to be used independently, and to an external antenna (not shown) via the external connector 2 when the portable transceiver 10 is to be carried on a vehicle. A battery (BATT) 3 supplies power to the control and operation circuit 1, the radio section 6 and the antenna 4, the latter two via the control and operation circuit 1. The external connector 2, arranged in the housing of the portable transceiver 10, serves as an external interface of the control and operation circuit and a car adapter or the like, which is connected when the portable transceiver 10 is to be carried on a vehicle.

When the portable transceiver 10 is independently used, a mouthpiece transmitter (T) 7 for outputting a transmit speech signal c to the radio section 6 and an earpiece receiver (R) 8 for inputting a receive speech signal d from the radio section 6 are used. When the portable transceiver 10 is carried on a vehicle, a microphone and a loud speaker connected to a car adapter (not shown) are connected to the radio section 6 via the external connector 2 for use in place of the transmitter 7 and the receiver 8, respectively.

The radio section 6 includes a diplexer (DIP) 61, a transmitting portion (TX) 62 and a receiving portion (RX) 63. The TX 62 generates the transmit signal a from the transmit speech signal c from the transmitter 7 and a control signal e supplied by the control and operation circuit 1. The RX 63 processes the receive signal b, and generates the receive speech signal d and another control signal f to be supplied to the control and operation circuit 1. The DIP 61 distributes and synthesizes the transmit signal a and the receive signal b, which have mutually different frequency components. The DIP 61 is connected to one end of the ANT-SW 5 and sends a radio frequency signal generated by the TX 62 to the antenna 4 or an external antenna for transmission to the base station. Conversely, the receive signal b from the antenna 4 or the external antenna is entered into the RX 63 via the DIP 61. The TX 62 and the RX 63 select a specific frequency channel and turn on and off a transmission carrier in accordance with the control signal e inputted from the control and operation circuit 1.

The control and operation circuit 1 includes a logic control circuit (LOGIC CONT) 14 for controlling call connections, communications and so forth through the radio section 6. The LOGIC CONT 14 further includes a microprocessor (CPU), a ROM, a RAM, an encoder/decoder for serial data (the control signals e and f) exchanged with the radio section 6 for connecting a call to or from the base station, and a power supply circuit for feeding power supplied from the BATT 3 to the constituent circuits of the control and operation circuit 1, the radio section 6 and the ANT-SW 5. To the LOGIC CONT 14 are connected an LCD display 11, a keyboard (KEY BOARD) 12 and an EEPROM 13. The LCD display 11, controlled by the LOGIC CONT 14, displays messages including those concerning the telephone number of the called party, entered by the user of the portable transceiver 10 through the KEY BOARD 12, the duration of the call, and the remaining power of the BATT 3. The KEY BOARD 12 is used to enter a control input signal into the LOGIC CONT 14. In the EEPROM 13 are stored, besides the ESN and the MSN, an assigned telephone number and a plurality of parameters needed for call connection, and the LOGIC CONT 14 reads into and write out of the EEPROM 13. An interface circuit (I/F) 15 is connected to the LOGIC CONT 14 and the external connector 2 to constitute an interface with optional units connected to the external connector 2. The external optional units include a car adapter and an ESN transfer unit, which will be described in more detail with reference to FIG. 3, for transferring the ESN stored in the EEPROM 14 to an EEPROM of another portable transceiver.

In this configuration, the external connector 2 is supposed to be the interfacing point for a high-frequency signal g flowing between the external antenna and the ANT-SW 5 and consisting of the transmit signal a and the receive signal b, and six kinds of serial data passing the external optional units and the I/F 15, i.e. REQ signals h1 and h2 which are control signals, DATA signals i1 and i2 which are eight-bit data, and CLK signals j1 and j2 which are clock signals.

When the ESN stored in the EEPROM 13 of the portable transceiver 10 is to be transferred to an EEPROM of another portable transceiver, the REQ signal h1, the DATA signal i1 and the CLK signal j1, out of all the signals passing the external connector 2 of the portable transceiver 10, are connected to the ESN transfer unit. Conversely, when the portable transceiver 10 is to receive an ESN from another portable transceiver, the REQ signal h2, the DATA signal i2 and the CLK signal j2, out of all the signals passing the external connector 2, are connected to the ESN transfer unit. Therefore, when the ESN is to be transferred from the portable transceiver 10 of FIG. 1 to another portable transceiver, the REQ signal h1, the DATA signal i1 and the CLK signal j1, out of all the signals passing the external connector 2, are connected to the ESN transfer unit. On the other hand in the external connector of the other portable transceiver (not shown), the REQ signal h2, the DATA signal i2 and the CLK signal j2 are connected to its ESN transfer unit. The ESN transfer unit of the portable transceiver 10 requests, via the I/F 15 with the REQ signal h1, the LOGIC CONT 14 of the portable transceiver 10 to transfer its ESN. The LOGIC CONT 14 reads out the ESN from the EEPROM 13, and transfers it via the ESN transfer unit to the EEPROM of the other portable transceiver.

In transferring the ESN, if the data contained in a specific part of the ESN, for instance the manufacturer's ID part, indicate the part to be "correct", the transfer to another portable transceiver will be accomplished. After the ESN has been transferred, the specific part of the ESN stored in the EEPROM 13 is rewritten under the control of the ESN transfer unit so that the data contained in that part indicate the part to be "incorrect". If the data contained in the specific part of the ESN stored in the EEPROM 13 indicate the part to be "incorrect", the ESN will not be transferred to any other portable transceiver. Since the ESN transfer is accomplished as described above, there can exist no plurality of portable transceivers having the same ESN. The MSN is not transferred when the ESN is transferred. As a result, it is ensured that the MSN have a content unique to the panel of each portable transceiver.

Next will be described the outgoing call connection and the incoming call connection in the preferred embodiment illustrated in FIG. 1.

Figure 2:
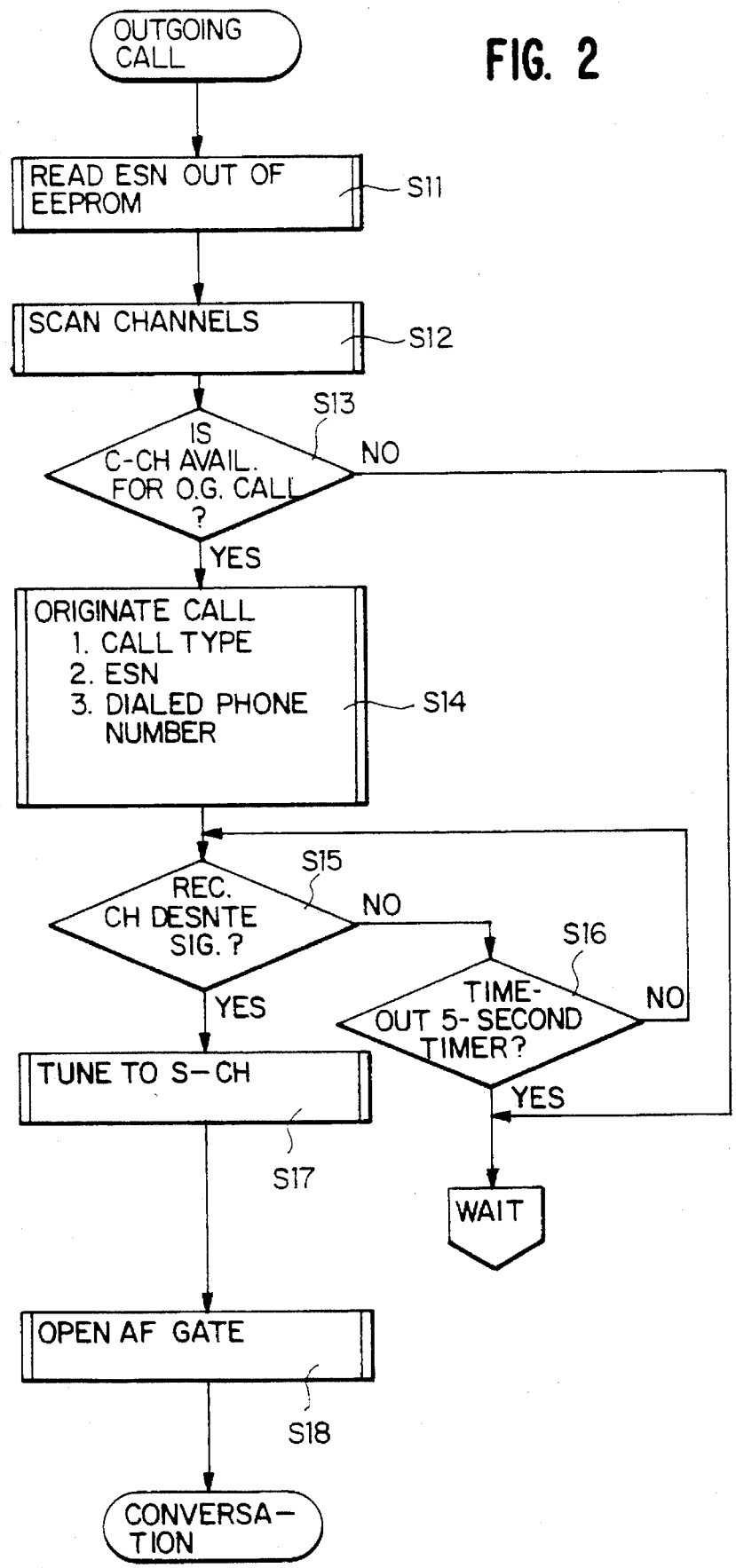
FIG. 2 is a flow chart showing the call initiating operation in the embodiment of FIG. 1.

FIG. 2 shows the flow of the outgoing call connecting procedure in the preferred embodiment of FIG. 1. When the user of the portable transceiver 10 unhooks the transceiver 10 to make a call initiating request and enters the telephone number of the party to be called through the KEY BOARD 12, the LOGIC CONT 14 reads out the ESN and the portable transceiver 10's own telephone number from the EEPROM 13, and stores them in a RAM for call connection (step S11). At this time, the other party's telephone number is also stored in the RAM temporarily. Then the LOGIC CONT 14 performs channel scanning to find a channel over which the call initiating request is to be transmitted to the base station (step S12). In the channel scanning operation, a plurality of control channels, which are made known from the base station in advance, by using the RX 63 to select an unused control channel. The LOGIC CONT 14 judges whether or not there is a control channel available for use in call initiation by the channel scanning operation of step S12 (step S13). In the absence of an available control channel (NO at step S13), the LOGIC CONT 14 ends the call initiating operation as a failure to initiate a call, and the portable transceiver 10 returns to a waiting mode to stand by for the next call initiating request.

If there is a control channel available for use in call initiation (YES at step S13), the LOGIC CONT 14 sends out an call initiation signal (in the form of the control signal e) over the available control channel by using the TX 62 (step S14). The call initiation signal consists of three kinds of signals including a call type signal indicating that a call initiation request is being made, ESN data and the called party's telephone number. The call type signal usually contains the call initiating portable transceiver 10's own telephone number. Upon completion of the sending of the call initiating signal at step S14, the LOGIC CONT 14 waits for the reception of a speech channel designating signal (the control signal f) from the base station by using the RX 63 (step S15). Here the base station is supposed to check the portable transceiver 10's own telephone number and ESN transmitted from the portable transceiver 10 with a telephone number and an ESN, respectively, registered in advance. If the ESN transmitted from the portable transceiver 10 is found "incorrect", no speech channel designating signal will be transmitted. When five seconds have passed with no speech channel designating signal being received (NO at step S15), it is taken as a five-second count-out (YES at step S16), and the LOGIC CONT 14 places the portable transceiver 10 in a waiting mode as the call initiating attempt has failed.

The LOGIC CONT 14, as it perceives the reception of the speech channel designating signal by YES at step S15, changes the channels of the TX 62 and the RX 63 to the designated speech channel (step S17), and opens the channel gates of the TX 62 and the RX 63 (step S18) to bring the portable transceiver 10 into a speech mode.

As hitherto described, in connecting an outgoing call between the portable transceiver 10 and the base station of a car telephone system, the portable transceiver 10 sends out the ESN stored in the EEPROM 13 in addition to its own telephone number. The base station checks whether both the telephone number and the ESN sent from the portable transceiver 10 are respectively identical with the telephone number and the ESN registered by its user in advance, and connects the call only when they are found identical.

In the connection of an incoming call in which the base station calls the portable transceiver 10, as in the case of connecting an outgoing call, there is a process in which the ESN read out of the portable transceiver 10's EEPROM 13 is checked at the base station and it is decided on the basis of the result of the checking whether or not the call is to be connected. Thus the control and operation circuit 1 of the portable transceiver 10, when it has perceived that the portable transceiver 10 is being called by a call arrival signal (the control signal f) from the base station, sends out a call arrival response signal (the control signal e). The call arrival response signal consists of two kinds of signals including a call arrival response type signal containing the portable transceiver 10's own telephone number and its ESN. At the base station, it is checked whether or not the portable transceiver 10's telephone number and ESN are registered in advance, and performs the call connecting operation only when they are found registered.

Figure 3:
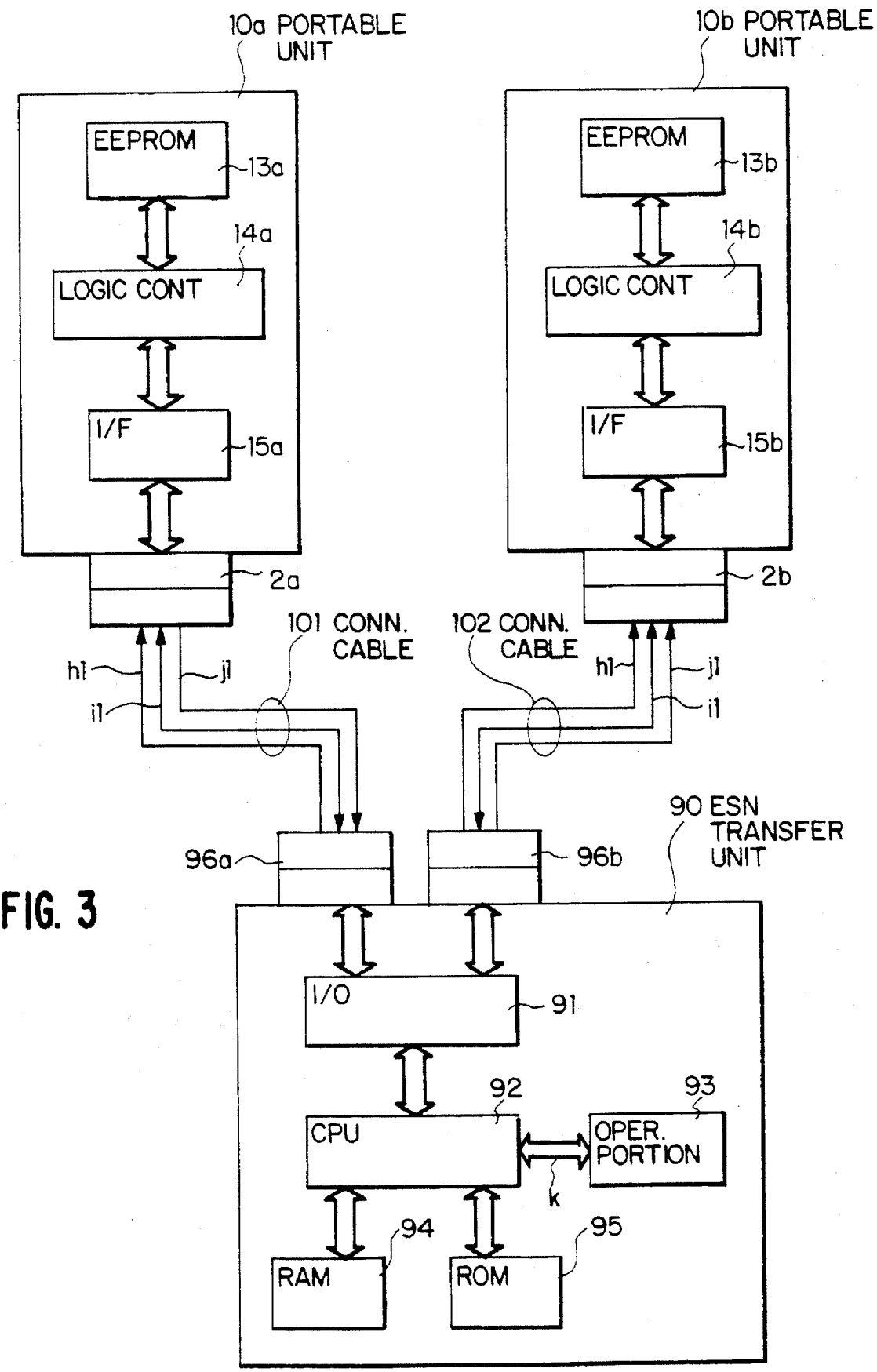
FIG. 3 is a block diagram illustrating the ESN transfer method for the portable transceiver of FIG. 1.

Referring now to FIG. 3, a portable transceiver 10a having a panel to be replaced and another portable transceiver 10b having a new panel are connected to an ESN transfer unit 90 via connecting cables 101 and 102, respectively. In the following description, each of the reference numerals of the constituent elements of the portable transceiver 10 illustrated in FIG. 1 will have a suffix of a to denote the constituent elements of the portable transceiver 10a and b to denote those of the portable transceiver 10b. In the illustration of the portable transceivers 10a and 10b are represented only the constituent elements involved in the ESN transfer. Thus external connectors 2a and 2b are connected to LOGIC CONT's 14a and 14b via I/F's 15a and 15b, respectively, and the EEPROM's 13a and 13b as well, to the LOGIC CONT's 14a and 14b.

The ESN transfer unit 90 involves a CPU 92 concerned with the whole all aspects of controlling the ESN transfer, an operation portion 93 for outputting a control signal k to the CPU 92, a RAM 94 connected to the CPU 92, and a ROM 95 also connected to the CPU 92. The ESN transfer unit has an input/output interface portion 91 which, constituting a circuit for interfacing with the CPU 92 and the portable transceivers 10a and 10b, is connected to connectors 96a and 96b. The input/output interface portion 91 is connected to the external connector 2a of the portable transceiver 10a via the connector 96a and the connecting cable 101, and similarly to the external connector 2b of the portable transceiver 10b via the connector 96b and the connecting cable 102. The connecting cable 101 transmits the REQ signal h1, the DATA signal i1 and the CLK signal j1, while the connecting cable 102 transmits the REQ signal h2, the DATA signal i2 and the CLK signal j2. These signals move back and forth between the CPU 92 and the LOGIC CONT 14a or 14b.

When it is decided, upon inputting of the control signal k from the operation portion 93, to transfer the ESN from the EEPROM 13a of the portable transceiver 10a to the EEPROM 13b of the portable transceiver 10b, the CPU 92 sends out the REQ signals h1 and h2, and transfers the ESN, the direction of the DATA signal i1 on the connecting cable 101 being set to be one from the portable 10 transceiver 10a to the ESN transfer unit 90 and that of the DATA signal i2 on the connecting cable 102, one from the ESN 90 to the portable transceiver 10b. At this time the CLK signal j1 is supplied from the LOGIC CONT 14a to the CPU 92, which processes this CLK signal j1 and transfers it as the CLK signal j2 to the LOGIC CONT 14b. In transferring the ESN, the CPU 92 first reads out the ESN from the EEPROM 13a via the LOGIC CONT 14a, and stores it into the RAM 94 temporarily. The CPU 92 checks a specific part of the ESN which has been read out, for instance the manufacturer's ID number, with the corresponding specific part of the ESN stored in advance in the ROM 95. If the two are found identical, the specific part is judged to be "correct", and the CPU 92 transfers the ESN temporarily stored in the RMA 94 to the EEPROM 13b via the LOGIC CONT 14b. If the specific part of the ESN is not found identical with the one stored in advance, the ESN will not be transferred. The CPU 92 changes the direction of the DATA signal i1 on the connecting cable 101 to one from the ESN transfer unit 90 to the portable transceiver 10a with the REQ signal h1, sends out data which are predetermined to indicate the "incorrectness" of the specific part of the ESN, and replaces the specific part of the ESN stored in the EEPROM 13a with these data via the LOGIC CONT 14a.

Thus, in the ESN transfer process illustrated in FIG. 3, if the ESN is transferred, the specific part of the ESN stored in the EEPROM 13a of the origin of transfer is rewritten to data indicating "incorrectness". As the ESN transfer unit 90 will not transfer the ESN if the specific part of the ESN stored in the EEPROM 13a consists of data indicating "incorrectness", it can be ensured that the ESN is the only such ESN in the field.

The MSN stored in the EEPROM 13a is not transferred in the ESN transfer process. Therefore the MSN remains a content unique to each panel of the portable transceiver such as the portable transceiver 10a or 10b. As a result, the maintenance of the portable transceiver can be carried out under unified management on the basis of this MSN. This facilitates, and serves to improve the appropriateness of, the maintenance of portable transceivers, as differentiated between repairs to be paid for and ones free of charge, for instance.

FIGS. 4(a) and 4(b) illustrate two memory areas of the EEPROM 13a contained in the portable transceiver 10a, which is the origin of the ESN transfer. In a first memory area E1 is stored the ESN unique to the panel of the portable transceiver 10a, and in a second memory area E2, the MSN unique to the panel of the portable transceiver 10a. These two data are supposed to be under the control of the manufacturer. The EEPROM 13a also has other memory areas in which to store the user-controlled data, such as the portable transceiver 10a's own telephone number.

FIG. 4(a) shows the ESN and the MSN stored in the EEPROM 13a before the ESN transfer. In the memory area E1 is stored ESN 02/08/00/33033. In this ESN, datum 02 is the manufacturer's ID number and the ESN's specific part indicating its "correctness". In the memory area E2 is stored MSN 08/33033.

FIG. 4(b) shows the data stored in the EEPROM 13b after the ESN transfer. The ESN in the memory area E1 has been changed to data 00/08/00/33033. Datum 00 is the ESN's specific part indicating its "incorrectness". The MSN data in the memory area E2 remain unchanged.

FIGS. 5(a) and 5(b) illustrate two memory areas E1 and E2 of the EEPROM 13b contained in the portable transceiver 10b, which is the destination of the ESN transfer. In the memory areas E1 and E2 shown in FIG. 5(a) are represented the ESN and the MSN before the transfer of the ESN in the EEPROM 13a. ESN 02/08/00/50001 is the ESN, and MSN 08/50001 is the MSN, both unique to the panel of the portable transceiver 10b. FIG. 6(b) shows the ESN and the MSN after the transfer of the ESN of the EEPROM 13a. The content of the memory area E1 is rewritten from 02/08/00/50001 to ESN 020/08/00/33033 assigned to the panel of the portable transceiver 10a. The MSN remains unchanged.

Figure 6:
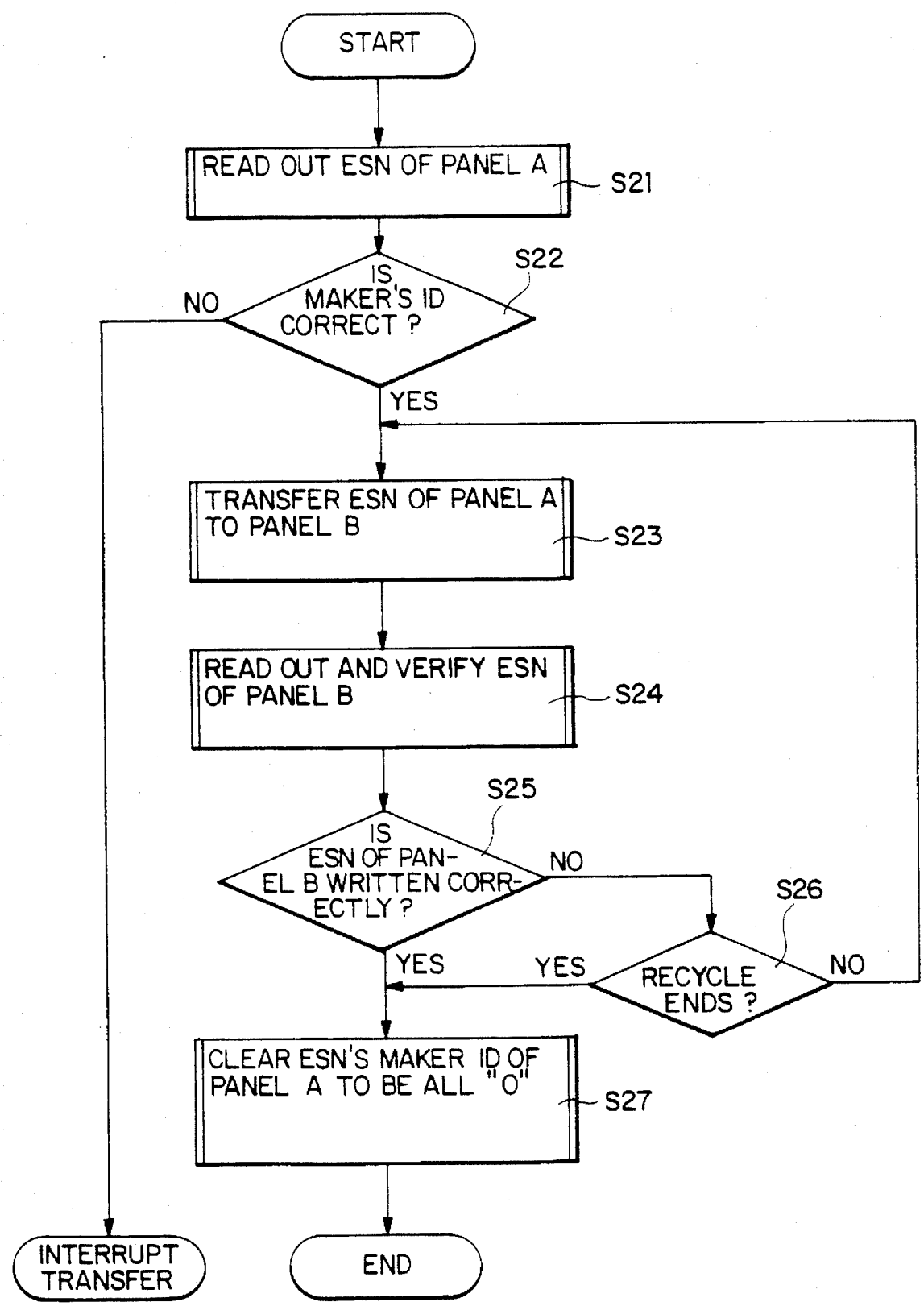
FIG. 6 is a flow chart showing the operation of the ESN transfer method illustrated in FIG. 3.

Now will be described in detail, referring to FIG. 6, the operation of the ESN transfer unit 90 illustrated in FIG. 3.

When an instruction to transfer the ESN is inputted from the operation portion 93 to the CPU 92, the CPU 92 first reads out the ESN stored in the memory area E1 of the EEPROM 13a mounted on the portable transceiver 10a, which is the origin of the ESN transfer, and stores it into the RAM 94 temporarily (step S21). Then the CPU 92 checks the ESN which has been read out with the manufacturer's ID number stored in the ROM 95, judges whether or not the manufacturer's ID number in the readout ESN is identical with the manufacturer's ID number stored in the ROM 95 and, if it is, will decide that the read-out manufacturer's ID number is correct (YES at step S22). If it is incorrect (NO at step S22), the CPU 92 will stop the transfer of the ESN and end processing. If the read-out manufacturer's ID number is correct, the CPU 92 will write the ESN, stored into the RAM 94 at step S21, into the memory area E1 of the EEPROM 13b mounted on the portable transceiver 10b, which is the destination of the ESN transfer (step S23). The CPU 92 further reads out the ESN from the memory area E1 of the EEPROM 13b, which is the destination of the ESN transfer, and performs a verify-check to see whether or not the ESN has been correctly transferred (step S24), and on that basis decides whether or not the ESN has been correctly written into the EEPROM 13b (step S25). If the finding of the verify-check denies the correct writing of the ESN into the EEPROM 13b (NO at step S25), the CPU 92 will perform the processing of steps S23 to S25 again. The CPU 92 further judges whether or not this processing has been repeated as many times as prescribed (step S26). This repeated processing is intended to avoid accidental trouble in the ESN transfer. The CPU 92, if it decides that the ESN has been correctly written into the EEPROM 13b (YES at step S25), or the processing from steps S23 to S25 has been repeated as many times as prescribed (YES at step S26), will change the manufacturer's ID number in the ESN stored in the memory area E1 of the EEPROM 13a, which is the origin of the ESN transfer, to "00" (step S27) and complete the ESN transfer processing.

Although the invention has been described with reference to the specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A portable transceiver comprising:

antenna means for converting a radio frequency signal received from a base station of a cellular telephone system into a receive signal and converting a transmit signal to be transmitted to said base station into a radio frequency signal;

radio frequency signal processing means having a receiving portion for receiving and processing said receive signal, a transmitting portion for generating said transmit signal, and a diplexer connected to said antenna means for separating and combining said receive and transmit signals;

control and operation means for processing calls and controlling communication to and from said base station by writing a first electronic serial number (ESN), predetermined so as to enable said base station to identify said portable transceiver, into and reading it out of an EEPROM for storing said ESN, and controlling said radio frequency signal processing means; and an external connector terminal to be connected to an ESN transfer apparatus so that, when said portable transceiver is a first transceiver to be replaced with a second transceiver on account of trouble occurring in part of said first transceiver and said first ESN is judged correct by said ESN transfer apparatus, said first ESN can be transferred to an EEPROM of said second transceiver without having to physically remove said EEPROM's from the respective first and second transceiver;

wherein said ESN transfer apparatus comprises rewriting means for modifying said first ESN to provide an incorrect version of said first ESN; and wherein, after said first ESN is properly transferred to said EEPROM of said second transceiver, said control and operations means of said first transceiver is responsive to said rewriting means to store said incorrect version of said first ESN in said EEPROM of said first transceiver;

whereby attempts to transfer said incorrect version of said first ESN from said EEPROM of said first transceiver are inhibited by said ESN transfer apparatus.

2. A portable transceiver, as claimed in claim 1, further comprising:

external antenna connecting means and antenna switch means housed in a casing so that, when said portable transceiver is carried on a vehicle, an external antenna installed on the vehicle can be connected in place of said antenna means to said radio frequency signal processing means;

telephone transmitter means for supplying speech signals to be transmitted to said transmitting portion; and telephone receiver means for receiving speech signals from said receiving portion.

3. A portable transceiver, as claimed in claim 1, wherein a specific part of said ESN is a manufacturer's ID number for identifying the manufacturer of said transceiver.

4. A portable transceiver, as claimed in claim 1, wherein a unique manufacturer's serial number (MSN), not to be transferred to the EEPROM of said second transceiver, is stored in the EEPROM of the first transceiver.

5. An electronic serial number (ESN) transfer system comprising:

first and second portable transceivers each constituting a mobile unit of a car telephone system; and an electronic serial number (ESN) transfer unit; wherein:

each of said first and second portable transceivers comprises:

first antenna means for converting a radio frequency signal sent out from a base station of said car telephone system into a receive signal and converting a transmit signal into a radio frequency signal to be transmitted to said base station;

first radio frequency signal processing means further comprising a receiving portion for receiving and processing said receive signal, a transmitting portion for generating said transmit signal, and a diplexer for separating and combining said receive signal and said transmit signal;

control and operation means comprising an EEPROM for storing a manufacturer's serial number (MSN), having a unique content, and an ESN to be used by said base station for identifying each portable transceiver;

a logic control circuit for reading and writing the ESN and controlling calls and communication to and from said base station by controlling said radio frequency signal processing means; and external connector means housed in a casing and connected to said control and operating means to constitute an interface with external units; and wherein:

said ESN transfer unit comprises ESN reading means for reading the ESN out of said EEPROM of said first portable transceiver via said external connector means of said first portable transceiver;

judging means for judging whether or not an ESN transfer of said ESN read out by said ESN reading means is enabled;

transfer means for transferring, only when it is judged that said ESN transfer is enabled, said ESN, read out by said ESN reading means, to said EEPROM of said second portable transceiver via said external connector means of said second portable transceiver, and rewriting a content of said ESN stored in said EEPROM of said second portable transceiver to that of said ESN read out of said EEPROM of said first portable transceiver; and rewriting means for rewriting, when it is judged that said ESN transfer is enabled, the ESN, stored in said EEPROM of said first portable transceiver, to a content which is to be judged that said ESN transfer is inhibited.

6. An ESN transfer system, as claimed in claim 5, wherein each ESN includes a manufacturer's ID number as a specific part.

7. An ESN transfer system, as claimed in claim 5, wherein each of said first and second portable transceivers further comprises external antenna connecting means and antenna switch means housed in a casing so that, when each portable transceiver is carried on a vehicle, an external antenna installed on the vehicle can be connected in place of said antenna means to said radio frequency signal processing means;

telephone transmitter means for supplying speech signals to be transmitted to said transmitting portion; and telephone receiver means for receiving speech signals from said receiving portion.

8. An ESN transfer system, as claimed in claim 7, wherein said ESN transfer unit comprises an operation portion for instructing said ESN reading means to transfer said read-out ESN.

9. An ESN transfer system, as claimed in claim 5, wherein each said control and operation means further comprises:

a keyboard connected to said logic control circuit to enable the user of each portable transceiver to enter a control signal;

LCD display means for displaying characters and signs under the control of said logic control circuit; and interface circuit means for interfacing said logic control circuit with said external connector means.

10. An ESN transfer system, as claimed in claim 5, wherein a connection between said external connector means and said ESN reading means and a connection between said external connector means and said transfer means are provided by a serial bus each.

11. An ESN transfer system, as claimed in claim 5, wherein said ESN transfer unit comprises:

first memory means for temporarily storing said read-out ESN as a first ESN; and second memory means for storing in advance said specific part of said first ESN, which is to be judged correct and wherein:

said judging means checks the specific part of the first ESN stored in said first memory means with said specific part of said first ESN stored in advance in said second memory means, which is to be judged correct, and judges whether or not the specific part of said first ESN stored in said first memory means is correct.

12. An electronic serial number (ESN) transfer unit comprising:

ESN reading means for reading, via a first external connector housed in the casing of a first portable transceiver in a car telephone system, a first ESN stored in a first EEPROM mounted on said first portable transceiver and used for identifying said portable transceiver;

judging means for judging whether or not an ESN transfer of a specific part of said first ESN read out by said ESN reading means is enabled;

transfer means for transferring, only when the specific part of said first ESN is judged correct, said first ESN read out by said ESN reading means to a second EEPROM in a second portable transceiver in said car telephone system via a second external connector housed in the casing of said second portable transceiver; and rewriting means for rewriting, when the ESN transfer of the specific part of said first ESN is judged enabled, the specific part of the first ESN stored in said first EEPROM to a content which is to be judged that the ESN transfer is inhibited.

13. An ESN transfer unit, as claimed in claim 13, further comprising an operation portion for instructing said ESN reading means to transfer said first ESN.

14. An ESN transfer unit, as claimed in claim 13, further comprising first memory means for temporarily storing said read-out first ESN; and second memory means for storing in advance said specific part of said first ESN, which is to be judged correct; wherein:

said judging means checks the specific part of the first ESN stored in said first memory means with said specific part of said first ESN stored in advance in said second memory means, which is to be judged correct, and judges whether or not the specific part of said first ESN stored in said first memory means is correct.

15. An ESN transfer unit as claimed in claim 12, wherein the connection between said first external connector and said ESN reading means and that between said second external connector and said transfer means are provided by a serial bus each.

16. An electronic serial number (ESN) transfer unit for transferring a first ESN, stored in a first EEPROM of a first portable transceiver in a car telephone system and used for identifying the transceiver, to a second EEPROM of a second portable transceiver in said car telephone system, comprising:

input/output interface means respectively connected, via first and second external connectors housed in casings of said first and second portable transceivers, to logic control circuits of said first and second portable transceivers, said circuits respectively containing said first and second EEPROMs, and respectively interfacing with said first and second portable transceivers, and CPU means having ESN reading means for reading out said first ESN from said first EEPROM via said input/output interface means and said first external connector; judging means for judging whether or not an ESN transfer of a specific part of said first ESN read out by said ESN reading means is enabled; transfer means for transferring, if the ESN transfer of the specific part of said first ESN is judged enabled, said first ESN read out by said ESN reading means to said second EEPROM via said input/output interface means and said second external connector; and rewriting means for rewriting, if the ESN transfer of the specific part of said first ESN is judged enabled, the specific part of the first ESN stored in said first EEPROM to a content to be judged that the ESN transfer is inhibited via said input/output interface means and said first external connector.

17. An ESN transfer unit, as claimed in claim 16, further comprising an operation portion for instructing said ESN reading means to transfer said first ESN.

18. An ESN transfer unit, as claimed in claim 17, further comprising first memory means for temporarily storing said read-out first ESN, and second memory means for storing in advance said specific part of said first ESN, which is to be judged correct, wherein:

said judging means checks the specific part of the first ESN stored in said first memory means with said specific part of said first ESN stored in advance in said second memory means, which is to be judged correct, and judges whether or not the specific part of said first ESN stored in said first memory means is correct.

19. An electronic serial number (ESN) transfer system comprising first and second portable transceivers, and an ESN transfer unit;

wherein each of said first and said second portable transceivers comprises, respectively:

an antenna switch, a radio section communicating through said antenna switch, a control and operation circuit using said radio section to process calls, and comprising (1) an EEPROM storing a unique respective ESN, and (2) a logic control circuit for reading from and writing to said EEPROM, and an external connector terminal for connecting said control and operation circuit to said ESN transfer unit;

wherein said ESN transfer unit comprises:

external connectors for connecting to said respective external connector terminal of each of said first and second portable transceivers, ESN reading means for reading said respective ESN of said first portable transceiver, via said respective operation and control circuit of said first portable transceiver, to provide an ESN to be judged, judging means for determining whether said ESN to be judged is correct or incorrect, transfer means for performing a transfer of said respective ESN of said first portable transceiver, via said respective operation and control circuit of said second portable transceiver, to said respective EEPROM of said second portable transceiver, and rewriting means for rewriting said respective ESN of said first portable transceiver to provide an incorrect ESN;

wherein when said judging means indicates that said ESN to be judged is correct, said transfer means performs said transfer, said rewriting means provides said incorrect ESN, and said incorrect ESN is stored in said respective EEPROM of said first portable transceiver; and wherein when said judging means indicates that said ESN to be judged is incorrect, said transfer means does not perform said transfer.

* * * * *

UNITED STATES PATENT AND TRADEMARK OFFICE
CERTIFICATE OF CORRECTION

PATENT NO. : 5,535,436
DATED : July 9, 1996
INVENTOR(S) : Ikio YOSHIDA, et al.

It is certified that error appears in the above-indentified patent and that said Letters Patent is hereby corrected as shown below:

Column 12, line 14, delete "a content" and insert --an incorrect version--.

Column 12, line 62, delete "a content" and insert --an incorrect version--.

Signed and Sealed this

Twelfth Day of November, 1996

Attest:

BRUCE LEHMAN

*Attesting Officer*     *Commissioner of Patents and Trademarks*